Patented Feb. 21, 1939

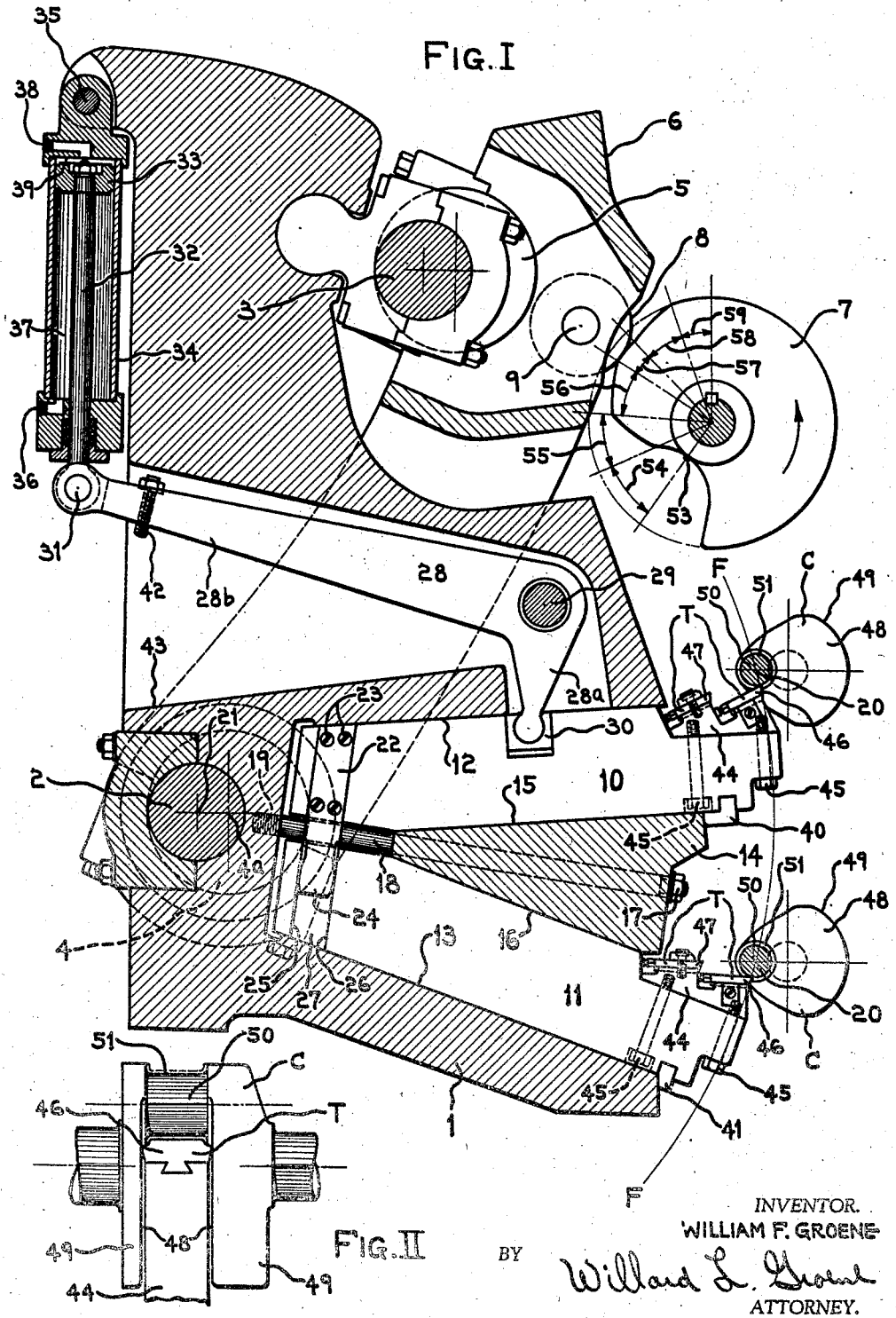

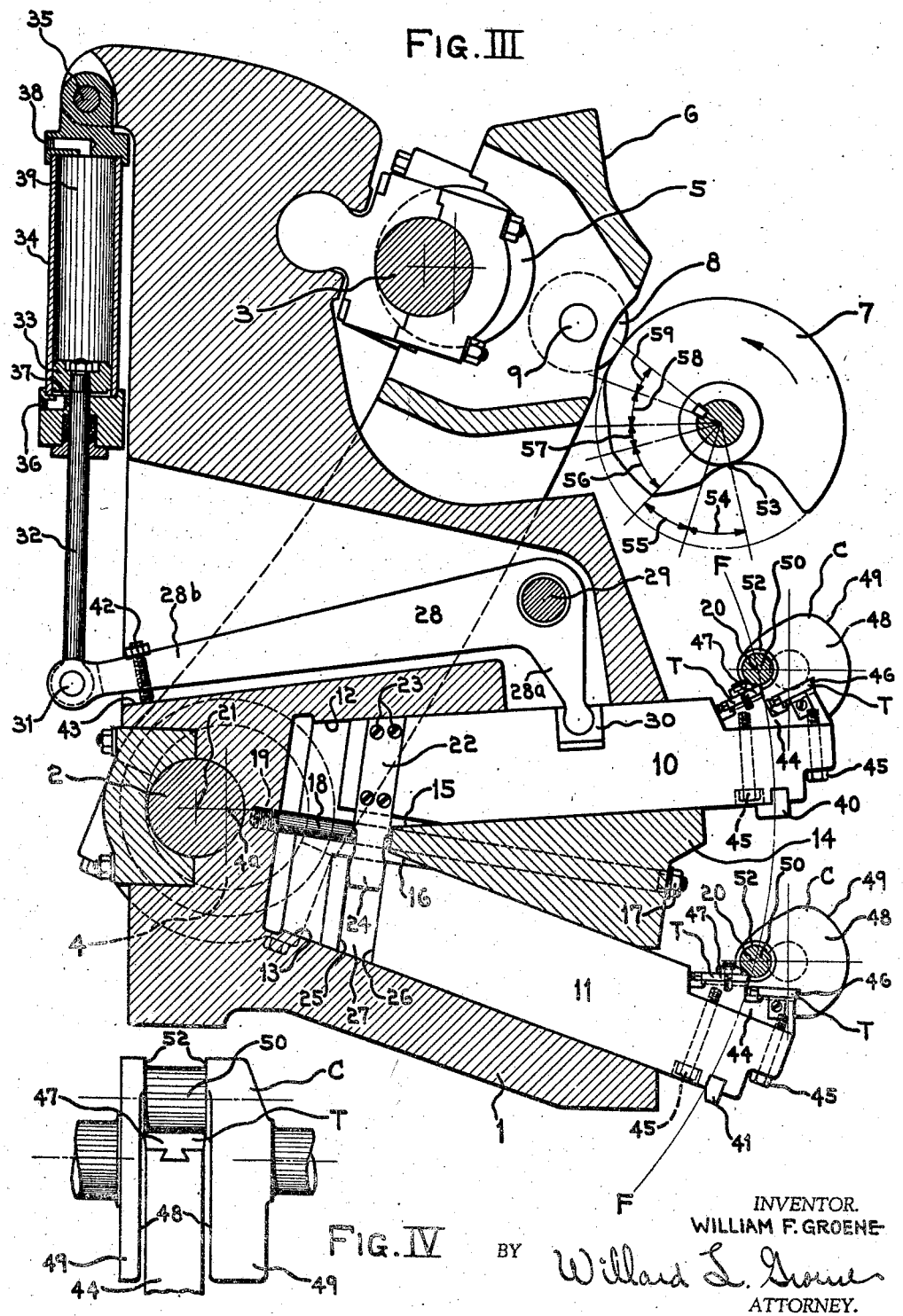

2,148,293

UNITED STATES PATENT OFFICE 2,148,293

TOOL FEED MECHANISM FOR LATHES

William F. Groene, Cincinnati, Ohio, assignor to The R. K. Le Blond Machine Tool Company, Cincinnati, Ohio, a corporation of Delaware Application May 6, 1937, Serial No. 141,133

36 Claims. (Cl. 82—9)

This invention pertains to tool feed mechanism for lathes, particularly to crankshaft lathes. For purposes of an exemplary disclosure I show my invention applied to an orbital lathe for machining the crank pins of crankshafts of a character fully set forth in my Patent 1,934,530 issued November 7, 1933, and in my co-pending application Serial No. 122,349 filed January 26, 1937.

Heretofore, it has been very difficult in lathes, particularly of the crankshaft type, to provide a suitable tool for roughing off the material of the crankshaft bearings and associated webs which would also maintain sufficient sharpness to provide proper finish turned dimensions for the work piece. To utilize such a tool to best advantage and maintain proper accuracy of the finished work piece has required very frequent changing and grinding of tools. Such a procedure results in high tool cost as frequent grinding quickly uses up the cutting tools. But still more costly has been the productive time lost from the lathe in which such a cutting method was used, especially in lathes of the multiple spindle high production type of a character set forth in my patent and application cited above. The stoppage of machines of this type for frequent tool changes obviously results in a greatly curtailed output and serious impairment of the efficiency of the machine.

With these former difficulties clearly in mind I conceived the idea to provide a tool for roughing out the metal and then to quickly substitute a finishing tool to complete the work. I have found by such an arrangement that practically no additional feeding or machining time is required as the substitution of one type tool for another may be accomplished substantially instantaneously, in fact I find by this arrangement I can rough out the work so much more rapidly, as the relative sharpness of the roughing tool need not be maintained at a high standard as in former methods, as to actually save machining time over former methods. I also have thus greatly reduced the tool changing time because the roughing tool need not be maintained highly sharpened and the finishing tool, which is only required to do very light trimming and final sizing of the work to accurate dimension, consequently maintains its necessary high sharpness for relatively long periods. Thus it can be clearly seen that my invention has greatly contributed to the usefulness of lathes, particularly crankshaft lathes.

An object of my invention is to provide a tool feeding mechanism for a lathe wherein a roughing tool is fed to a work piece to complete a roughing operation thereon and then, immediately upon completion of said roughing operation, the roughing tool is removed from cutting position and a finishing tool rapidly brought to cutting position whereupon a finishing operation is undertaken to thereby complete the machining of said work piece.

It is also my intention to provide a lathe in which a plurality of different cutting tools may be successively presented to a work piece to complete a machined surface on said work piece.

A further object is to provide a lathe in which a plurality of different cutting tools may be successively presented and fed to a work piece in which the work need not be rechucked, the work spindle rotation stopped, or the feeding movement interrupted in changing from one cutting tool to another.

A still further object is to provide in an orbital lathe adapted to machine the crank pins of crankshafts, means for presenting a tool to a crankshaft wherein the cheeks of the webs adjacent the crank pins are machined and the crank pins rough turned and means for rapidly replacing said tool with a second tool whereby the crank pins and associated fillets are finish machined during uninterrupted rotation of the work piece and uninterrupted feeding movement of the lathe.

And still another feature of my invention is to provide on a tool feed carriage for lathe means whereby each of a plurality of cutting tools may be rapidly presented to cutting position relative to a work piece whereby a plurality of different machining operations may be successively undertaken upon the work piece upon feeding of said carriage.

Other features of my invention will be pointed out in the following description of the drawings in which:

Figure I is an elevation partly in section of a tool carrier unit of an orbital crank pin lathe incorporating my invention, particularly showing the relative position of the tools and work piece at the completion of the roughing operation and just at the instant of presentation of the finishing tools to cutting position.

Figure II is an enlarged view perpendicular to the axis of rotation of the crankshaft to more clearly show the relative position of the tools and crankshafts in Figure I.

Figure III is an elevation partly in section of the tool carrier unit of Figure I but showing the relative position of the tools and work piece at the completion of the finishing operation with the machining operations completed on the crankshaft.

Figure IV is an enlarged view perpendicular to the axis of rotation of the crankshaft to more clearly show the relative position of the tools and crankshafts in Figure III.

My invention is shown applied to an orbitally moving tool carrier unit 1 which is mounted on the crank pins 2 and 3 of the usual master crankshafts 4 and 5 respectively, the upper master crankshaft 5 being carried in the usual cradle 6 for swinging about the axis of rotation 4a of the lower master crankshaft 4 for appropriately swinging the tool carrier 1 to effect a feeding of cutting tools T carried on said unit in the arcuate line of feeding F—F in a manner fully set forth and described in my co-pending application referred to above. The cradle 6 may be actuated in swinging movement for various types of feeding purposes by the rotary feeding cam 7 which contacts the roller 8 rotatably mounted on the stud 9 fixed in the cradle 6 in a manner also as fully set forth in said co-pending application above.

Slidably mounted in the tool carrier unit 1 are the tool bars 10 and 11 which are confined axially of the crankshafts C by appropriate means in the unit 1 and which slide on the surfaces 12 and 13 respectively of said unit 1. A suitable wedge-shaped gib 14, having surfaces 15 and 16 bearing against the respective tool bars 10 and 11, may be drawn rearwardly toward the master crank pin 2 (Figures I and III) by screwing down on the nut 17 carried on the stud 18 fixed in the unit 1 by the threads 19 to thereby maintain proper sliding contact of the bar 10 with surfaces 12 and 15 and the bar 11 with the surfaces 13 and 16.

Preferably the tool bar for each work piece C should be arranged to slide in a line substantially parallel to a plane passing through the axis of rotation 20 of the work surface to be machined and the axis of swinging 21 of the unit 1 about the crank pin 2 of the lower master crankshaft 4 or substantially perpendicular to the line of feeding direction to thereby facilitate presenting various different tools T to the crankshaft C with a minimum disturbance of normal feeding movement along the line F—F. It is also preferable to have the tool bars 10 and 11 slidable perpendicular to the axes 20 of the work surfaces to be machined when work of a character particularly shown in Figures II and IV is to be undertaken so as to provide proper access of the various cutting tools T to the work surfaces to be machined.

Inter-connecting means are provided between the bars 10 and 11 so that they both may be moved simultaneously by actuating one of the bars, as for example the bar 10. The interconnecting means comprises a bar 22 fixed to the tool bar 10 by screws 23 which has a rounded end 24 adapted to engage the sides 25 and 26 of the slot 27 formed in the tool bar 11 whereby sliding movement of the tool bar 10 will cause similar sliding movement in the tool bar 11 even though the bars 10 and 11 do not slide in parallel paths.

Means are provided for actuating the bars 10 and 11 in sliding motion comprising a bell crank 28 pivotally mounted on a pin 29 fixed in the tool carrier unit 1 and having one of its arms 28a engaging the tool bar 10 by a suitable pivotal connection 30. The other arm 28b of the bell crank 28 is pivotally connected by a suitable pin 31 to a piston rod 32 of a reciprocatable piston 33 carried in a cylinder 34 pivotally mounted on the tool carrier unit 1 by a suitable pin 35. A passageway 36 connects with the piston rod chamber 37 and a passageway 38 connects with the piston head chamber 39 whereby fluid pressure may be applied to either of said chambers for reciprocating the piston 33 and thereby the tool bars 10 and 11. Means are provided for accurately positioning the tool bars 10 and 11 comprising stop blocks 40 and 41 fixed on the respective tool bars 10 and 11 which abut against the gib 14 on the tool carrier unit 1 to limit inward travel of the bars and an adjustable means 42 normally fixed in the arm 28b of bell crank 28 which is adapted to abut against a suitable surface 43 of the tool carrier unit 1.

Mounted on each of the tool bars 10 and 11 are tool holders 44 by appropriate bolts 45, each of the tool holders carrying cheeking and roughing tools 46 and finishing tools 47.

In this exemplary disclosure the tools 46 (Fig. II) are adapted to machine the cheeks 48 of the webs 49 and to rough machine the crank pin 50, as shown by broken line 51, of the crankshafts C, said tools being maintained in the arcuate path F—F and fed toward the work by the cam 7 as shown in Figure I.

The cutting tools 47 (Figure IV) are adapted to finish machine the crank pins 50 and accurately trim the faces of the fillets 52 associated therewith when these tools are brought into the arcuate path F—F and fed toward the work by the cam 7 as shown in Figure III.

It is to be clearly understood that it is not necessary to have the tools 46 alike for both the upper and lower work pieces C nor to have the tools 47 alike. Different operations may be simultaneously undertaken on each of the work pieces C when either tools 46 or 47 are in cutting position. For example, the tool 46 operating on the lower work piece C might do only cheeking operations while the tool 46 operating on the upper work piece C might do only rough machining of the crank pins 50. The tools 47 might similarly do different types of work on each of the work pieces.

The mode of operation of my invention is substantially as follows: At the beginning of the machining cycle the cradle 6 and tool carrier unit 1 are swung forwardly and downwardly to the right, Figure I, by so rotating the feed cam 7 whereby the roller 8 of the cradle 6 contacts the periphery of the cam 7 at the point 53. Under these circumstances suitable means, preferably operated and controlled by the rotation of the cam 7 by any conventional means, cause fluid pressure to be applied to the piston rod chamber 37 through passageway 36 of cylinder 34 to thereby slide the tool bars 10 and 11 to bring the cutting tools 46 in the arcuate feeding path F—F.

The cam 7 is then rotated through the arc 54 to cause the tools 46 to rapid traverse to the work pieces C. Further rotation of the cam 7 through the arc 55 produces coarse feeding of the tools 46 for machining the cheeks 48; and rotation through the arc 56 causes fine feeding of said tools for roughing out the crank pins 50.

At the completion of the roughing out of the crank pins 50 fluid pressure is applied to the chamber 39 through the passageway 38 of the cylinder 34 to rapidly outwardly thrust the tool bars 10 and 11 to thereby bring the cutting tools 47 into the arcuate path of feeding F—F as shown in Figure III. This movement of cutting tools 47 to cutting position may be undertaken while the cam 7 is actuating the tool carrier unit 1 in feeding movement as the tools 46 will merely be pushed out of the cut and become inoperative, the tools 47 being so positioned relative to the rough surfaces machined by tools 46 as not to come in contact with the work until fully and accurately positioned in the arcuate feeding path F—F even though the feeding of the carrier 1 is continuously going on. When such procedure is followed continuous feeding is produced by the cam 7 when rotating through the arcs 56, 57, and 58.

In some instances it may be desirable to dwell the tools 46 on the work pieces C just before transferring to the tools 47. In such instances the surface of the cam 7 will be so arranged as to produce a dwell while rotating through the arc 57, the feeding of the tools 47 being accomplished by rotation of the cam 7 through the arm 58. The tools 47 may also be caused to dwell on the work pieces C by arranging the periphery of the cam to cause a dwell while rotating through the arc 59.

Having fully set forth and described my invention what I claim is:

1. In an orbital lathe, means for supporting and rotating a work piece in said lathe, an orbitally moving tool carrier in said lathe adapted to be fed relative to a work piece in said lathe, a plurality of tool means on said member, means to cause relative feeding of said tool carrier, and means for successively presenting each of said tool means to said work piece.

2. In a lathe having a pivotally mounted member adapted to be swung relative to a work piece in said lathe, means for moving said member in a predetermined arcuate path of feeding, a plurality of tool means movably mounted on said member, and means for moving said tool means substantially parallel to a plane passing through the axis of rotation of the work surface being machined and the axis of pivoting of said member to successively present each of said tool means to said work piece.

3. In a lathe, a member movable relative to a work piece in said lathe, a member movably mounted on said first mentioned member, a plurality of tool means mounted on said last mentioned member, means for moving said first mentioned member to cause said tool means to be moved in a given direction, and means on said first mentioned member to move said second mentioned member substantially perpendicular to said given direction whereby each of said tool means may be successively presented to said work piece.

4. In a lathe, a member movable relative to a work piece in said lathe, a member movably mounted on said first mentioned member, a plurality of tool means mounted on said last mentioned member, means for moving said first mentioned member, and means operable by the movement of said first mentioned means for moving said second mentioned means whereby each of said tool means may be successively presented to said work piece.

5. In a lathe, a member adapted to be fed perpendicular to the axis of rotation of the work surface to be machined on a work piece in said lathe, a plurality of tool means on said member mounted for movement in a plane substantially perpendicular to the direction of feeding of said member, means for actuating said member, and means for actuating said tool means to successively present each of said tool means to said work piece.

6. In a lathe, a member adapted to be fed perpendicular to the axis of rotation of the work surface to be machined on a work piece in said lathe, a plurality of tool means on said member mounted for movement in a plane substantially perpendicular to the direction of feeding of said member, means for actuating said member in rapid traverse, coarse feed, fine feed, or dwell, and means for actuating said tool means to successively present each of said tool means to said work piece.

7. In a lathe, a member adapted to be fed perpendicular to the axis of rotation of the work surface to be machined on a work piece in said lathe, a plurality of tool means on said member mounted for movement in a plane substantially perpendicular to the direction of feeding of said member, means for actuating said member in rapid traverse, coarse feed, fine feed, and dwell, and means operable by the means for actuating said member for actuating said tool means when said member is in dwell.

8. In an orbital lathe, an orbitally moving tool carrier unit adapted to be swung relative to a work piece in said lathe, a tool bar slidably mounted in said unit, a plurality of tools mounted on said bar, means on said unit for sliding said bar whereby each of said tools may be rapidly presented to said work piece, and means for swinging said unit for causing a relative feeding of said tools and said work piece.

9. In an orbital lathe, an orbitally moving tool carrier unit adapted to be swung relative to work pieces in said lathe, tool bars slidably mounted in said unit, a plurality of tools mounted on each of said bars, means on said unit for simultaneously sliding said bars whereby a tool on each of said bars may be rapidly presented to said work piece, and means for swinging said unit for causing simultaneous relative feeding of said tools and said work pieces.

10. In an orbital lathe, an orbitally moving tool carrier unit adapted to be swung relative to work pieces in said lathe, tool bars slidably mounted for movement in different directions in said unit, a plurality of tools mounted on each of said bars, means on said bars to cause them to slide simultaneously, means on said carrier for sliding said bars by actuating one of said bars, a plurality of tools mounted on each of said bars adapted to be successively presented to said work pieces when said bars are actuated, and means for swinging said unit for causing a relative feeding of said tools and work pieces.

11. A tool feed mechanism for an orbital lathe comprising an orbital member movable relative to a work piece in said lathe, a plurality of tool means movably mounted on said member, means to cause orbital and feeding movements in said member, and means to cause movement of said tool means for successively presenting each of said tool means to said work piece.

12. A tool feed mechanism for an orbital lathe comprising an orbital member movable relative to a work piece in said lathe, a roughing tool and a finishing tool movably mounted on said member, means to cause orbital and feeding movements in said member, and means for moving said tools for presenting either the roughing tool or the finishing tool to said work piece.

13. A tool feed mechanism for lathe comprising a member adapted to be fed relative to a work piece in said lathe, a plurality of tool means movably mounted on said member, means to cause relative feeding of said member, means for moving said plurality of tool means on said member for successively presenting each of said tool means to a work piece in said lathe during the continuous relative feeding of said member.

14. A tool feed mechanism for lathe comprising a member adapted to be fed relative to a work piece in said lathe, a plurality of tool means movably mounted on said member, means for moving said tool means for successively presenting each of said tool means to a work piece in said lathe, means for momentarily stopping said relative feeding of said member as each tool means is presented to said work piece, and means effective after the presentation of all of said tool means to said work piece to reverse said relative feeding.

15. A tool feed mechanism for lathe comprising a member adapted to be fed relative to a work piece in said lathe, a roughing tool and a finishing tool movably mounted on said member, means to cause relative feeding of said member, and means for moving said tools on said member for successively presenting the roughing tool and the finishing tool to continuous unidirectional work piece during said relative feeding of said member.

16. A tool feed mechanism for lathe comprising a member adapted to be fed relative to a work piece in said lathe, a plurality of cutting tools movably mounted on said member, means to cause continuous relative feeding of said member, and means for moving said plurality of tools on said member so as to successively present each of said cutting tools to said work during said relative feeding of said member.

17. In a lathe, a rotatable work holder, means for rotating said work holder, a member adapted to be fed relative to a work piece in said work holder, a plurality of cutting tools movably mounted on said member, means to cause relative feeding of said member, and means for moving said cutting tools on said member for presenting each of said cutting tools to said work piece during the continuous relative feeding of said member and the rotation of said work holder.

18. In an orbital crankshaft lathe, means for chucking and rotating a crankshaft to be machined, an orbitally moving tool carrier member adapted to be fed relative to said crankshaft, means to cause relative feeding of said member, a plurality of cutting tools movably mounted on said member, and means for moving said cutting tools for successively presenting each of said cutting tools to the crank pin bearings and associated portions of a crankshaft.

19. In a crankshaft lathe, means for chucking and rotating a crankshaft to be machined, a tool carrier member adapted to be fed relative to said crankshaft, a tool movably mounted on said member adapted to cheek a web adjacent a bearing and to rough turn said bearing of said crankshaft, a second tool movably mounted on said member adapted to finish turn said bearing, means to cause relative feeding of said member, and means for moving both of said tools for successively presenting one and then the second of said tools to said crankshaft to completely machine a bearing portion and associated surfaces of said crankshaft during the continual application of said relative feeding movement.

20. A tool feeding mechanism for lathe comprising a member movable relative to a work piece in said lathe, a plurality of different types of cutting tools movably mounted on said members, means to cause movement of said member and means to cause movement of said tools on said member to successively present each of said tools to said work piece during continuous relative movement of said member whereby a plurality of different types of machining operations may be successively undertaken on said work piece.

21. In a lathe, means for supporting and rotating a work piece in said lathe, a pivotally mounted member adapted to be swung in continuous relative feeding movement to a work piece in said lathe, a plurality of tool means movably mounted on said member, means to cause movement of said member, and means to cause movement of said tools on said member for successively presenting each of the tool means to said work piece during said continuous relative feeding.

22. In a multiple spindle lathe, means for supporting and rotating a plurality of work pieces in said lathe, a member adapted to be fed relative to said work pieces, a plurality of tool means for each of said work pieces movably mounted on said member, means to cause continuous relative feeding of said member and said work pieces, and means for moving said tool means on said member for successively presenting each of said tool means to said work pieces during said continuous relative feeding.

23. In a multiple spindle lathe, means for supporting and rotating a plurality of work pieces in said lathe, a member adapted to be fed relative to said work pieces, a plurality of tool means for said work pieces movably mounted on said member, means to cause continuous relative feeding of said member and means to cause movement of said tool means on said member for simultaneously presenting each of said tool means to said work pieces during said continuous relative feeding.

24. In a multiple spindle lathe, means for supporting and rotating a plurality of work pieces in said lathe, a member adapted to be fed relative to said work pieces, a plurality of different types of cutting tools for said work pieces movably mounted on said member, means to cause relative feeding of said member, and means to cause movement of said tools on said member for simultaneously presenting some of said types of tools to said work pieces and for simultaneously presenting others of said types of tools to said work pieces for performing different types of machining operations simultaneously in a successive manner on said work pieces.

25. A tool feed mechanism for lathe comprising a member movable perpendicular to the axis of a work piece in said lathe, a plurality of tool means movably mounted on said member for movement substantially tangentially of the work surface to be machined on said work piece, means to cause movement of said member, and means for moving said tool means on said member for successively presenting each of said tool means to the work surface of said work piece.

26. A tool feed mechanism for an orbital lathe comprising a member movable relative to a work piece in said lathe, a plurality of tool means on said member, means to cause orbital and relative feeding movements in said member, and means for successively presenting said tool means to said work piece.

27. In an orbital lathe, a rotatable work spindle, an orbitally moving tool carrier associated with said spindle, a plurality of tool means associated with said carrier, and means for successively presenting each of said tool means to said work spindle.

28. In an orbital lathe, a rotatable work spindle, an orbitally moving tool carrier associated with said spindle, a roughing tool and a finishing tool associated with said carrier, and means for alternately presenting one or the other of said tools to said work spindle.

29. In an orbital crankshaft lathe, means for supporting and rotating a crankshaft in said lathe, an orbitally moving tool carrier in said lathe adapted to be fed relative to said work piece, a roughing tool and a finishing tool on said member, means to cause relative feeding of said tool carrier, and means for presenting one or the other of said tools to said work piece.

30. In a lathe, means for supporting and rotating a work piece in said lathe, a tool carrier member adapted to be fed relative to said work piece, a relatively dull tool mounted on said member adapted to rough machine said work piece, a second relatively sharp tool mounted on said member adapted to finish machine said work piece, means to cause relative feeding of said member and work piece, and means for successively presenting each of said tools to said work piece.

31. In a lathe, means for supporting and rotating a work piece in said lathe, a tool holder, a relatively dull tool and a relatively sharp tool carried on the tool holder, and means to shift one or the other of said tools to cutting position.

32. In an orbital lathe, means for supporting and rotating a work piece in said lathe, an orbitally moving tool carrier member adapted to be fed relative to said work piece, a relatively dull tool mounted on said member adapted to rough machine said work piece, a second relatively sharp tool mounted on said member adapted to finish machine said work piece, means to cause feeding and orbital movements in said member, and means for successively presenting each of said tools to said work piece.

33. In a lathe, a plurality of work spindles, radially disposed tool holders associated with said spindles, a plurality of cutting tools mounted on each of said tool holders, means for feeding said tool holders relative to said work spindles, and means for successively presenting said cutting tools to working position relative to said work spindles.

34. In an orbital lathe, a plurality of work spindles, radially disposed tool carriers associated with said spindles, a plurality of cutting tools mounted on each of said carriers, means for feeding said carriers relative to said work spindles, and means for rotating said work spindles and actuating said tool carriers in orbital movement in synchronism.

35. In a lathe, a plurality of work spindles, a plurality of radially disposed tool holders associated with said work spindles, multiple cutting tools mounted on said tool holders, and common means associated with said tool holders to change said cutting tools while operating upon work piece in said work spindles.

36. In an orbital lathe, a plurality of work spindles, a plurality of radially disposed tool holders associated with said work spindles, means for rotating said work spindles and actuating said tool holders in orbital movement in synchronism, multiple cutting tools mounted on said tool holders, and common means associated with said tool holders to move respective cutting tools in synchronism into and out of cutting position.

WILLIAM F. GROENE.